United States Patent
Melin et al.

(10) Patent No.: US 10,477,442 B2
(45) Date of Patent: Nov. 12, 2019

(54) SOURCE AND A TARGET NETWORK NODE AND RESPECTIVE METHODS PERFORMED THEREBY FOR PERFORMING HANDOVER OF A WIRELESS DEVICE

(71) Applicant: Telefonaktiebolaget LM Ericsson (publ), Stockholm (SE)

(72) Inventors: Lena Melin, Vaxholm (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/761,273

(22) PCT Filed: Sep. 21, 2015

(86) PCT No.: PCT/SE2015/050979
§ 371 (c)(1),
(2) Date: Mar. 19, 2018

(87) PCT Pub. No.: WO2017/052423
PCT Pub. Date: Mar. 30, 2017

(65) Prior Publication Data
US 2018/0262958 A1    Sep. 13, 2018

(51) Int. Cl.
*H04W 36/00* (2009.01)
*H04W 24/10* (2009.01)
(Continued)

(52) U.S. Cl.
CPC ...... *H04W 36/0088* (2013.01); *H04B 17/318* (2015.01); *H04B 17/336* (2015.01);
(Continued)

(58) Field of Classification Search
CPC ............. H04W 24/10; H04W 36/0058; H04W 36/0085; H04W 36/0088; H04W 36/0094; H04W 36/0016; H04W 36/00837
See application file for complete search history.

(56) References Cited

U.S. PATENT DOCUMENTS

2008/0132173 A1    6/2008  Sung et al.
2011/0069633 A1*   3/2011  Schmidt ............... H01Q 1/246
                                                   370/254
(Continued)

FOREIGN PATENT DOCUMENTS

EP          2381720 A2     10/2011
EP          2621225 A1      7/2013
WO    WO 2013/131552 A1    9/2013

OTHER PUBLICATIONS

International Search Report and Written Opinion of the International Searching Authority, PCT/SE2015/050979, dated May 20, 2016, 11 pages.
(Continued)

*Primary Examiner* — Ashley Shivers
(74) *Attorney, Agent, or Firm* — Sage Patent Group

(57) ABSTRACT

A method performed by a source network node comprises requesting a wireless device to perform measurement(s) on a possible target network node and the source network node; and obtaining a measurement report from the wireless device comprising performed measurement(s) on a possible target network node, the performed measurements indicating received signal strength for signal(s) received from the possible target node. The method further comprises determining a first normalised SINR associated with the received signal strength as measured by the wireless device for signals received from the source network node; and providing, to the possible target network node, the determined first normalised SINR associated with the received signal
(Continued)

strength for the source network node and the received signal strength of the possible target network node as received in the measurement report from the wireless device.

25 Claims, 11 Drawing Sheets

(51) Int. Cl.
| | |
|---|---|
| *H04B 17/336* | (2015.01) |
| *H04W 52/36* | (2009.01) |
| *H04B 17/318* | (2015.01) |
| *H04B 17/382* | (2015.01) |
| *H04W 36/30* | (2009.01) |
| *H04W 72/04* | (2009.01) |

(52) U.S. Cl.
CPC .......... *H04B 17/382* (2015.01); *H04W 24/10* (2013.01); *H04W 52/365* (2013.01); *H04W 36/0058* (2018.08); *H04W 36/30* (2013.01); *H04W 72/0406* (2013.01)

(56) References Cited

U.S. PATENT DOCUMENTS

| | | | |
|---|---|---|---|
| 2015/0024752 A1 | 1/2015 | Oh et al. | |
| 2015/0163709 A1* | 6/2015 | Lee | H04L 65/1069 370/332 |
| 2015/0358981 A1* | 12/2015 | Chae | H04W 72/085 370/252 |

OTHER PUBLICATIONS

"On Macro Diversity for E-UTRA," TSG-RAN WG1 Ad Hoc on LTE, Sophia Antipolis, France, Jun. 20-21, 2005, Agenda Item 4.3 (R1-050624) 3 pages.

European Extended Search Report dated May 13, 2019 for European Patent Application No. 15904823.0, 9 pages.

Huawei, "Intra LTE-A UE Handover Procedure inter-eNB for CA," 3GPP TSG RAN WG2 Meeting #67bis, R2-095814, Miyazaki, Japan, Oct. 12-16, 2009, 4 pages.

\* cited by examiner

SOURCE AND A TARGET NETWORK NODE AND RESPECTIVE METHODS PERFORMED THEREBY FOR PERFORMING HANDOVER OF A WIRELESS DEVICE

CROSS REFERENCE TO RELATED APPLICATIONS

This application is a 35 U.S.C. § 371 national stage application of PCT International Application No. PCT/SE2015/050979 filed on Sep. 21, 2015, the disclosure and content of which is incorporated by reference herein in its entirety.

TECHNICAL FIELD

The present disclosure relates to wireless communication and in particular to a source and target network node, and respective method performed thereby, for handing over a wireless device.

BACKGROUND

The radio access scheme selected for Long Term Evolution, LTE supports event triggered downlink measurements based on Reference Signal Received Power, RSRP, and Reference Signal Received Quality, RSRQ. The typical handover evaluation for coverage triggered handover used today is downlink measurements performed by the wireless device and using event triggered measurement reporting. The serving network node (also referred to as the source network node) that receives the measurement reports from the wireless device initiate handover preparation and sends a handover request to a target network node and indicate the strongest reported cell as target cell. A network node may be associated with one or more cells each being a coverage area of the network node.

For inter frequency handovers, the cell of the target network node may be the best reported cell and good enough in downlink to be chosen. Handover oscillations are avoided by making sure that target is a couple dB better than the cell of the serving network node or good enough so no new Inter-frequency-handover is triggered when the wireless device arrives to target cell. If the uplink conditions between cells are roughly the same (no cell is disturbed significantly more in uplink than another cell) and the cell sizes are the same on one frequency layer, the method is typically enough for appropriate handover decisions. The method may be adjusted by using frequency offset and/or cell individual offset to compensate in general for different cell sizes and for different uplink conditions.

However, if frequency offset or cell individual offset is used those offsets need typically be semi stationary set and need to have rather large margins to avoid handover oscillations or moving to a cell where the uplink is not good.

SUMMARY

The object is to obviate at least some of the problems outlined above. In particular, it is an object to provide a source network node and a method performed thereby as well as a target network node and a method performed thereby for handover of a wireless device from the source network node to the target network node. These objects and others may be obtained by providing a source network node, a target network node and respective methods performed by a source network node and a target network node according to the independent claims attached below.

According to an aspect a method performed by a source network node serving a wireless device in a wireless communication network is provided. The method comprises, when the uplink signal quality of a received uplink signal from the wireless device is deemed poor, requesting the wireless device to perform measurement(s) on possible target network node(s) and the source network node; and obtaining a measurement report from the wireless device comprising performed measurement(s) on at least one possible target network node, the performed measurements indicating received signal strength for signal(s) received from the at least one possible target node. The method further comprises determining a first normalised Signal to Interference and Noise Ratio, SINR, associated with the received signal strength as measured by the wireless device for signals received from the source network node; and providing, to at least one of the at least one possible target network node, the determined first normalised SINR associated with the received signal strength for the source network node and the received signal strength of the at least one of the at least one possible target network node as received in the measurement report from the wireless device.

According to an aspect a method performed by a target network node for handing over a wireless device to the target network node from a source network node serving the wireless device in a wireless communication network is provided. The method comprises obtaining, from the source network node, a determined first normalised SINR for the source network node in relation to the wireless device and a received signal strength for signal(s) transmitted from the target network node as received by the wireless device; and determining a first normalised SINR for the target network node based at least partly on the received signal strength as obtained from the source network node. The method further comprises determining whether the target network node is a better option than the source network node for serving the wireless device based on the first determined SINR for the target network node and based on the received first normalised SINR for the source network node; and providing, to the source network node, an indication indicating whether the target network node is a better option than the source network node for serving the wireless device.

According to an aspect a source network node serving a wireless device in a wireless communication network is provided. The source network node is configured for, when the uplink signal quality of a received uplink signal from the wireless device is deemed poor, requesting the wireless device to perform measurement(s) on possible target network node(s) and the source network node; and for obtaining a measurement report from the wireless device comprising performed measurement(s) on at least one possible target network node, the performed measurements indicating received signal strength for signal(s) received from the at least one possible target node. The source network node is further configured for determining a first normalised Signal to Interference and Noise Ratio, SINR, associated with the received signal strength as measured by the wireless device for signals received from the source network node; and for providing, to at least one of the at least one possible target network node, the determined first normalised SINR associated with the received signal strength for the source network node and the received signal strength of the at least one of the at least one possible target network node as received in the measurement report from the wireless device.

According to an aspect a target network node for handing over a wireless device to the target network node from a source network node serving the wireless device in a wireless communication network is provided. The target network node is configured for obtaining, from the source network node, a determined first normalised SINR for the source network node in relation to the wireless device and a received signal strength for signal(s) transmitted from the target network node as received by the wireless device; and determining a first normalised SINR for the target network node based at least partly on the received signal strength as obtained from the source network node. The target network node is further configured for determining whether the target network node is a better option than the source network node for serving the wireless device based on the first determined SINR for the target network node and based on the received first normalised SINR for the source network node; and providing, to the source network node, an indication indicating whether the target network node is a better option than the source network node for serving the wireless device.

The method performed by the source network node, the method performed by the target network node and the source network node and the target network node have the same possible advantages. One possible advantage is that it is possible to trigger a measurement by the wireless device only if the received uplink signal quality is bad. Another possible solution is that it is possible to compare source and target uplink signal quality using a quantity that has the same definition, the first normalised SINR, and which is based on one measurement device, i.e. the wireless device. Another possible advantage is that it is possible to estimate uplink signal quality for a target network node without being forced to measure on an uplink transmission from the wireless device for the target network node. Still a possible advantage is that the same threshold values may be used in the source and the target network node due to the first normalised SINR, regardless of whether the respective coverage areas are of different sizes, they are associated with different noise and/or interference levels, the wireless devices have different power class or the network nodes allow the wireless device to send more or less power in the respective coverage area of the source and target network nodes respectively.

BRIEF DESCRIPTION OF DRAWINGS

Embodiments will now be described in more detail in relation to the accompanying drawings, in which.

DETAILED DESCRIPTION

Briefly described, a source network node and a target network node as well as respective methods performed thereby for handing over a wireless device from the source network node to the target network node are provided. In addition to downlink measurements, the source and the target network node also evaluates the uplink characteristics. By determining a normalised Signal to Interference and Noise Ratio, SINR, for the source network node and the target network node respectively, two SINR values are obtained that may be compared irrespective of different characteristics of the respective cells of the source network node and the target network node.

Generally, handover decisions are based on downlink measurements/characteristics only. However, the measurements on downlink signals and/or channels and/or characteristics of a downlink channel do not always provide a correct and fully detailed picture of a situation for a wireless device in a cell of the serving network node. It is possible that the downlink channel may be satisfactorily while the uplink is not, or the uplink channel may be satisfactorily while the downlink is not. Consequently, possible problems in uplink, which may not be indicated by downlink measurement, must be considered without knowing if there actually are any uplink problems. One way of doing so is to apply extra (and perhaps unnecessary) margins on downlink thresholds used in handover decisions. Such a scheme may result in that handover may be trigger too soon than necessary, especially if the uplink quality is acceptable. This in turn results in a sub-optimisation of the communication network.

Different examples of a network node are a radio base station, a base station, a base station controller, a NodeB, an evolved NodeB and a radio network controller.

Different examples of a wireless device are a User Equipment, UE, a mobile phone, a smart phone, a laptop, a personal digital assistant, a dongle that may communicate wirelessly with network nodes of a communication network, a vehicle being able to communicate wirelessly with network nodes of a communication network etc.

Embodiments herein relate to a method performed by a source network node serving a wireless device in a wireless communication network. Embodiments of such a method will now be described with reference to FIGS. 1a-1c.

Figure 1A:
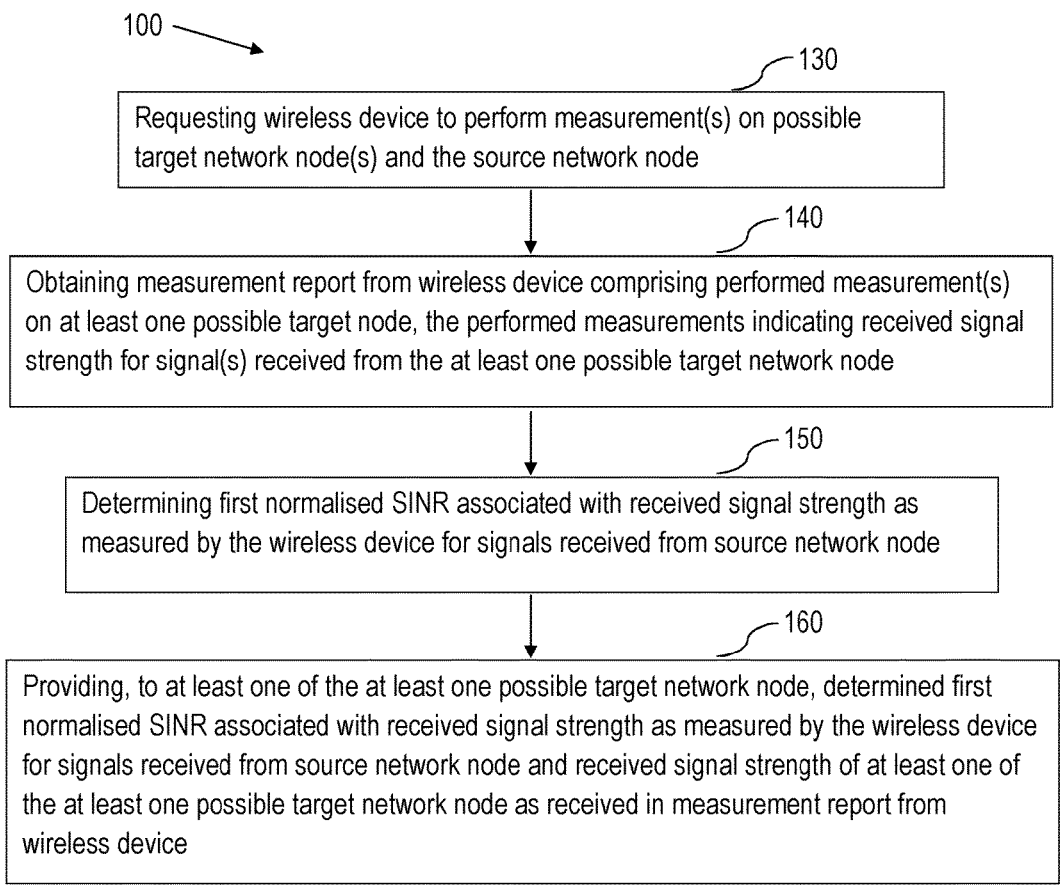
FIG. 1a is a flowchart of a method performed by a source network node according to an exemplifying embodiment.

FIG. 1a illustrates the method comprising, when the uplink signal quality of a received uplink signal from the wireless device is deemed poor, requesting 130 the wireless device to perform measurement(s) on possible target network node(s) and the source network node; and obtaining 140 a measurement report from the wireless device comprising performed measurement(s) on at least one possible target network node, the performed measurements indicating received signal strength for signal(s) received from the at least one possible target node. The method further comprises determining 150 a first normalised Signal to Interference and Noise Ratio, SINR, associated with the received signal strength as measured by the wireless device for signals received from the source network node; and providing 160, to at least one of the at least one possible target network node, the determined first normalised SINR associated with the received signal strength for the source network node and the received signal strength of the at least one of the at least one possible target network node as received in the measurement report from the wireless device.

The wireless device may move around within the coverage area of the source network, thereby sometimes being relatively close to the serving network node and sometimes being relatively far away from the serving network node. When the wireless device is relatively far from the serving network node. The wireless device may be moving towards one or more neighbouring network nodes, wherein the wireless device may approach a location or position in which signals transmitted from the wireless device to the source network may be of relatively poor quality. There may be different ways to define or determine an uplink signal as being poor. Signals transmitted from the wireless device towards the source network node are subjected to pathloss, e.g. due to the distance between the wireless device and the source network node. Further, the signals may be subjected to interference, e.g. from other wireless devices in its vicinity and/or wireless device also being served by the source network node. Thus, poor uplink quality may be determined as a pathloss, or gain, being below a threshold, or a SINR being below a threshold just to give a couple of examples. More detailed examples are given below.

Once the source network deems the uplink signal quality of a received uplink signal from the wireless device as poor, the source network node may not be the most suitable network node to serve the wireless device. The source network node thus requests the wireless device to perform measurement(s) on possible target network node(s) and the source network node. In this manner, the source network node requests information from the wireless device to help the source network node in determining whether or not the source network node is still the best option as serving network node, or if a possible target node is more suited, i.e. is a better option, for serving the wireless device.

Network nodes may transmit pilot signals or reference signals/symbols upon which that wireless device may perform different measurements. Depending on the position or location of the wireless device, it may receive pilot signals or reference signals/symbols from the source network node and one or more possible target network nodes. The wireless device performs different measurements on the signals it receives and sends a measurement report to the source network node.

The network node thus obtains the measurement report from the wireless device comprising performed measurement(s) on one or more possible target network nodes, the performed measurements indicating received signal strength for signal(s) received from the one or more possible target network nodes. The source network node then determines a first normalised SINR, associated with the received signal strength as measured by the wireless device for signals received from the source network node. By determining the first normalised SINR for the source network node, a "value" or measure is obtained which may be compared to a corresponding normalised SINR for possible target network nodes, irrespective of whether the source network node and the possible target network nodes have different numbers of served wireless device, different transmission powers, different sizes of their respective coverage area and so on. The manner in which to determine the first normalised SINR for the source network node will be described in more detail below.

Once the source network node has determined the first normalised SINR for the source network node, the source network node provides it to at least one of the one or more possible target network nodes, The source network node also encloses the respective received signal strength of the respective possible target network node as received in the measurement report from the wireless device when providing the first normalised SINR for the source network node at least one of the one or more possible target network nodes.

Merely as a simplified example, assume there are three possible target network nodes T1, T2 and T3. Assume further that only T1 and T3 are selected by the source network node. The source network node then provides (a) the first normalised SINR for the source network node and the received signal strength of T1 (as received in the measurement report from the wireless device) to T1; and (b) the first normalised SINR for the source network node and the received signal strength of T2 (as received in the measurement report from the wireless device) to T2.

In this manner, the at least one of the one or more possible target network nodes may determine if any of them is a better option for serving the wireless device or not. How this is done will be described in more detail below.

The method perform by the source network node has several possible advantages. One possible advantage is that it is possible to trigger a measurement by the wireless device only if the received uplink signal quality is bad. Another possible solution is that it is possible to compare source and target uplink signal quality using a quantity that has the same definition, the first normalised SINR, and which is based on one measurement device, i.e. the wireless device. Another possible advantage is that it is possible to estimate uplink signal quality for a target network node without being forced to measure on a uplink transmission from the wireless device for the target network node. Still a possible advantage is that the same threshold values may be used in the source and the target network node due to the first normalised SINR, regardless of whether the respective coverage areas are of different sizes, they are associated with different noise and/or interference levels, the wireless devices have different power class or the network nodes allow the wireless device to send more or less power in the respective coverage area of the source and target network nodes respectively.

The received signal strength may be represented by Reference Signal Received Power, RSRP, and wherein the first normalised SINR associated with the received signal strength is determined at least partly based on the RSRP associated with the source network node.

There are different measures or examples of received signal strength, e.g. RSRP, Reference Signal Received Quality, and Received Signal Strength Indicator, RSSI, just to mention some. Any one is possible to use for determining the first normalised SINR. In this disclosure, for simplicity, only the RSRP will be described. The source network node may thus consider one or more of received signal strength as measured by the wireless device, an average noise and interference (N+I) which is measured by the source network node in uplink, the transmission power of the source network node by means of which the reference signal was transmitted, the maximum transmission power of the wireless device, and pathgain when determining the first normalised SINR.

Figure 1B:
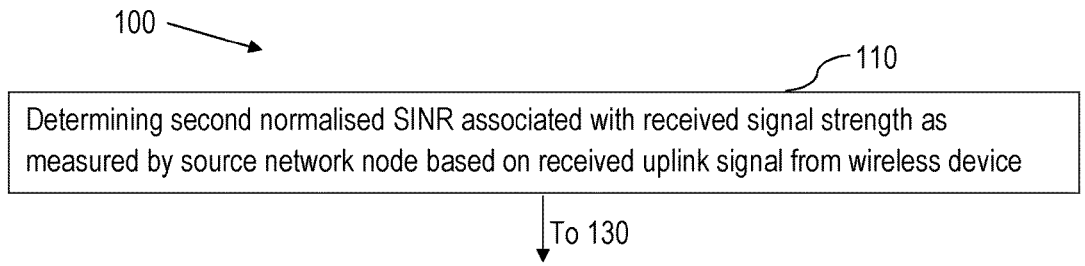
FIG. 1b is a flowchart of a method performed by a source network node according to another exemplifying embodiment.

The method may further comprise, as illustrated in FIG. 1b, determining 110 a second normalised SINR associated with received signal power as measured by the source network node based on the received uplink signal from the wireless device, wherein the uplink signal quality of the received signal is deemed poor when the received signal strength is below a predefined threshold, e.g. the second normalised SINR for the source network node is below a predefined threshold.

By the second normalised SINR associated with received signal power as measured by the source network node based on the received uplink signal from the wireless device, the source network node obtains a measure or value, in the same manner as for the first normalised SINR as measured by the wireless device. The source network node may then compare the second normalised SINR for the network node with the predefined threshold.

If the second normalised SINR for the network node is above the threshold, the uplink received signal strength may be deemed good and if the second normalised SINR for the network node is below the threshold, the uplink received signal strength may be deemed poor. If the second normalised SINR for the network node is at the threshold, then it may be up to the implementation to determine if such a second normalised SINR for the network node is to be deemed good or poor.

The second normalised SINR for the source network node may be determined based on a reference signal or symbol(s) transmitted by the wireless device, e.g. DeModulation Reference Symbols, DMRS, of the received signal and indicates a maximum expected uplink quality possible to achieve per PRB.

The wireless device may transmit different reference signals to be used by the receiving source network node for different purposes. One example of reference signals that the wireless device may transmit is DMRSs. DMRSs enables the source network node to demodulate the transmission from the wireless device in an appropriate manner so that the source network node may correctly "understand" the content of the transmission. The DMRSs are transmitted from the wireless device using a transmission power that is known to, and potentially also controlled by, the source network node.

Thus, measuring the received signal strength with regard to DMRSs will provide the source network node with information pertaining to pathloss, gain, interference and more. Using this information, the source network node may thus determine the second normalised SINR for the source network node indicating e.g. the quality of the uplink channel. As for the first normalised SINR for the source network node may consider a plurality of parameters when determining the second normalised SINR, e.g. one or more of received signal strength as measured by the network node, an average noise and interference (N+I) which is measured by the source network node in uplink, the transmission power of the wireless device by means of which the reference signal was transmitted, the maximum transmission power of the wireless device, and pathgain.

The second normalised SINR for the source network node indicating a maximum expected uplink quality possible to achieve per PRB may in this disclose also be denoted as SINRmaxDMRS for the source network node.

In an example, the second normalised SINR for the source network node is further based on an estimated pathloss, which is estimated based on received power in uplink knowing the transmission power used by the wireless device to transmit the signal, and also based on (i) power headroom reports from the wireless device, on (ii) maximum transmission power of the wireless device, on (iii) allowed transmission power for the wireless device and based on (iv) an average noise and interference in a cell of the source network node by means of which the source network node is servicing the wireless device.

By performing different measurements on the received uplink transmission from the wireless device, the source network node may determine different characteristics of the uplink channel or the uplink received transmission. One example of a characteristic that the source network node may determine or estimate is the pathloss. The source network node may estimate the pathloss on e.g. the DMRSs. In addition to the requested and obtained measurement report, the wireless device transmits other reports to the source network node, e.g. power headroom reports. Power headroom indicates how much transmission power left for a wireless device to use in addition to the power being used by current transmission. The pathloss may be estimated by comparing the received signal strength with the transmission power of the wireless device with which the wireless device transmitted the DMRSs. In more detail, the second normalised SINR may be determined as PSDreceived+PHestimated+$10*\log(NPRB)-(N+I)$, where PSDreceived is the received signal power as measured on DMRS symbols. PHestimated is power headroom, i.e. the difference between maximum transmission power of the wireless device and used transmission power. NPRB is the number of Physical Resource Blocks, PRBs, that the wireless devices has transmitted data on, on the current Transmission Time Interval, TTI, (i.e. this milli second).

The wireless device also has a maximum transmission power that it may employ, this is also known by the source network node and may be used when determining the second normalised SINR for the source network node. It may also be that the wireless device is restricted to only employ a certain transmission power that is less than the maximum transmission power that it may employ. In such a case, that maximum allowed transmission power for the wireless device may be used in addition to, or instead of the maximum transmission power of the wireless device when determining the second normalised SINR for the source network node.

The source network node may be associated with one or more cells by means of which the source network node is servicing the wireless device. It may be that different cells of the source network node have different characteristics with regards to e.g. average noise and interference in respective cell. The average noise and interference in a cell may affect the quality of the uplink transmission from the wireless device and hence the average noise and interference in the cell of the source network node by means of which the source network node is servicing the wireless device may be used when determining the second normalised SINR for the source network node.

The first normalised SINR for the source network node is determined based on an RSRP for a downlink Cell-specific Reference Signal, CRS, transmitted from the source network node as reported by the wireless device, and pathloss between the source network node and the wireless device, wherein the first normalised SINR for the source network node indicates a maximum expected uplink quality possible to achieve per Physical Resource Block, PRB.

In order to the wireless device to be able to perform different measurements, also the source network node may transmit different reference signals, wherein CRS is an example thereof.

The wireless device may use the CRS to measure and/or estimate pathloss between the source network node and the wireless device. The CRS is transmitted using a transmission power that is known to the wireless device. By comparing the received signal strength of the CRS and the known used transmission power, the wireless device may estimate the pathloss associated with the channel on which the CRS was transmitted.

The first normalised SINR for the source network node indicating a maximum expected uplink quality possible to achieve per PRB may in this disclose also be denoted as SINRmaxRSRP for the source network node.

Figure 1C:
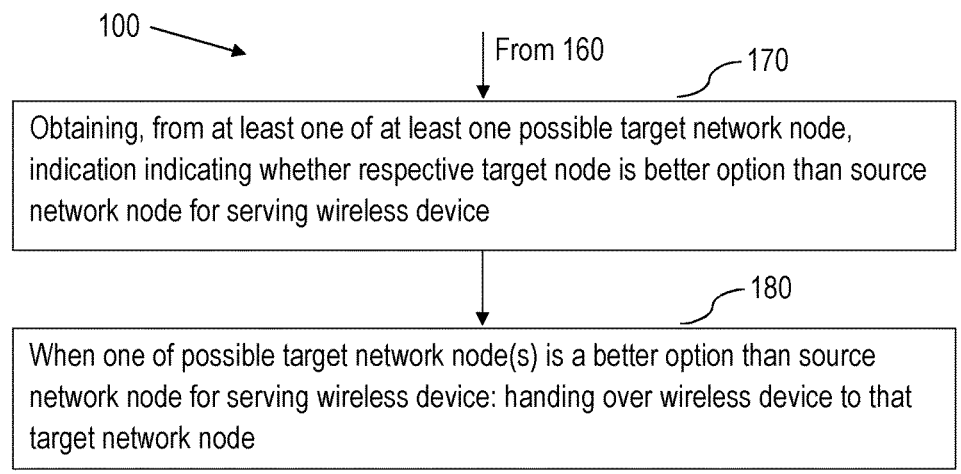
FIG. 1c is a flowchart of a method performed by a source network node according to yet an exemplifying embodiment.

The method may further comprise, as illustrated in FIG. 1c, obtaining 170 an indication from the at least one of the at least one target network node indicating whether the respective target network node is a better option than the source network node for serving the wireless device.

When the source network node provides the determined first normalised SINR associated with the received signal strength for the source network node and the received signal strength of one possible target network node as received in the measurement report from the wireless device to that one possible target network node, that one possible target network node may determine a corresponding first normalised SINR for the target network node indicating a maximum expected uplink quality possible to achieve per PRB in a cell of the target network node. The target network node may then compare the first normalised SINR for the source network node and the first normalised SINR for the target network node and based on that comparison determine whether the target network node is a better option than the source network node for serving the wireless device. This will be explained in more detail below. The target network node will inform the source network of whether it has determined that it may be the better option than the source network node for serving the wireless device or not.

Thus, the source node obtains the indication from the at least one of the at least one target network node indicating whether the respective target network node is a better option than the source network node for serving the wireless device.

In an example, the providing 160 of the determined first normalised SINR for the source network node and the received signal strength of the at least one possible target network node; and/or the obtaining 170 of the indication from the at least one of the at least one target network node comprises communication between the source network node and the target network node(s) by means of the X2 or S1 protocol.

The source network node and the one or more possible target network node may be employed in e.g. an LTE network. If so, then the network nodes may communicate using the X2 protocol.

Alternatively, the network nodes may communicate via one or more Mobility Management Entities, MMEs, using the S1 protocol.

The communication by means of the X2 protocol may comprise X2 private messages.

There are different messages that are defined in the X2 protocol for different purposes. One type of X2 messages are called X2 private messages. X2 messages may carry non-standard signalling, Those are messages—such as X2 private messages—or Information Elements in private extensions, that allow the message content to be more specifically adapted to a particular company or operator.

X2 private messages may be used for e.g. non-standard applications.

In an example, the providing 160 of the determined first normalised SINR for the source network node and the received signal strength of the at least one possible target network node is performed by transmitting a handover request to the at least one possible target network node comprising the determined normalised SINR and the RSRP.

In a handover procedure, there are different messages that are previously standardised and thus used between for example the source network node and the target network node during the handover procedure.

The handover request is an example of such a message. Without using the method and solution described herein, the handover request would comprise just a request, wherein the target network node would generally accept the handover request, unless e.g. heavily overloaded. Using the solution described herein, the handover request comprises the above described information enabling the one or more possible target network nodes to perform different calculations and/or estimations to determine if the circumstances, e.g. the uplink conditions, are such that the respective target network nodes is a better option than the source network node for serving the wireless device or not.

In yet an example, the obtaining 170 of the indication from the at least one of the at least one target network node comprises receiving a handover request acknowledge message indicating an acknowledgement or a refusal for a handover of the wireless device.

There is a corresponding handover message that may be used to reply to a handover request message, i.e. the handover request acknowledge message. The handover acknowledge message is used to either acknowledge that handover request or to refuse the handover request.

The received handover request acknowledge message may comprise an indication of a reason for the refusal if the handover request acknowledge message comprises a refusal, e.g. an estimated first normalised SINR for the target network node.

It may be that there are different reasons why the target network node refuses the handover request. Following the method and solution described above, one reason is that the target network node is not a better option than the source network node for serving the wireless device.

However, it may also be that the target network node is experiencing a relatively high load and that it is not possible for the target network node to accept the handover.

Embodiments herein also relate to a method performed by a target network node for handing over a wireless device to the target network node from a source network node serving the wireless device in a wireless communication network. Embodiments of such a method will now be described with reference to FIGS. 2a and 2b.

Figure 2A:
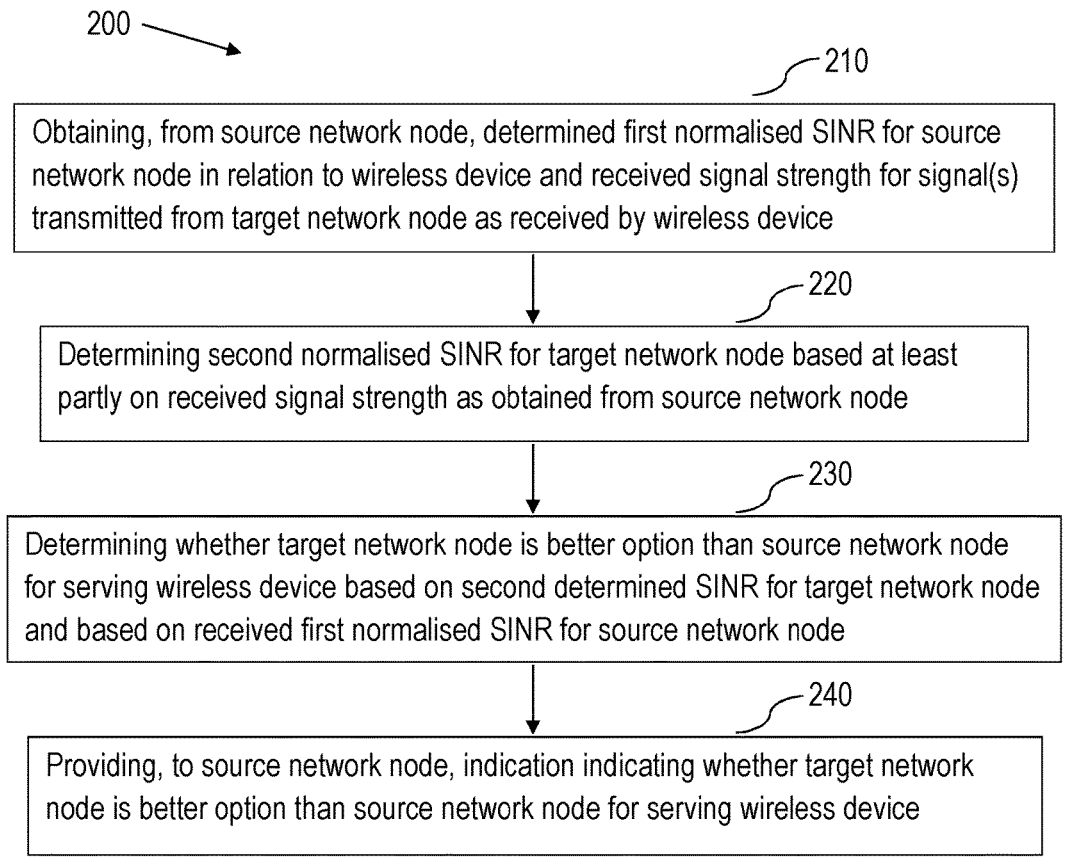
FIG. 2a is a flowchart of a method performed by a target network node according to an exemplifying embodiment.

FIG. 2a illustrates the method 200 comprising obtaining 210, from the source network node, a determined first normalised SINR for the source network node in relation to the wireless device and a received signal strength for signal(s) transmitted from the target network node as received by the wireless device; and determining 220 a first normalised SINR for the target network node based at least partly on the received signal strength as obtained from the source network node. The method further comprises determining 230 whether the target network node is a better option than the source network node for serving the wireless device based on the first determined SINR for the target network node and based on the received first normalised SINR for the source network node; and providing 240, to the source network node, an indication indicating whether the target network node is a better option than the source network node for serving the wireless device.

When the source network node has received the measurement report from the wireless device, it determines the first normalised SINR for the source network node. In an example, the first normalised SINR for the source network node is denoted SINRmaxRSRP-source. From the measurement report, the source network node also selects one or more possible target network nodes based on the received signal strength, RSS, of the respective target network nodes. Then the source network node provides the SINRmaxRSRP-source and the respective RSS to respective possible target network nodes.

In this manner, the target network node obtains (from the source network node) the SINRmaxRSRP-source and the RSS for signals transmitted from the target network node. using at least the RSS for signals transmitted from the target network node, the target network node determines a corresponding first normalised SINR for the target network node, which e.g. may be denoted SINRmaxRSRP-target. It shall be pointed out that the received signal strength, RSS, may be measured on any reference signal, not necessarily RSRP, thus RSRP is merely an example.

Since the SINRmaxRSRP-source and the SINRmaxRSRP-target are normalised, they may be directly compared to each other and thus they may serve as an indication of the quality of uplink transmissions from the wireless device to the source and the target network node respectively. Comparing the SINRmaxRSRP-source and the SINRmaxRSRP-target, the target network node may determine whether or not the target network node is the better option than the source network node for serving the wireless device.

The target network node then informs the source network node of the result, i.e. the target network node provides the source network node with the indication indicating whether or not the target network node is the better option than the source network node for serving the wireless device.

The method performed by the target network node has the same possible advantages as the method performed by the source network node. One possible advantage is that it is possible to trigger a measurement by the wireless device only if the received uplink signal quality is bad. Another possible solution is that it is possible to compare source and target uplink signal quality using a quantity that has the same definition, the first normalised SINR, and which is based on one measurement device, i.e. the wireless device. Another possible advantage is that it is possible to estimate uplink signal quality for a target network node without being forced to measure on a uplink transmission from the wireless device for the target network node. Still a possible advantage is that the same threshold values may be used in the source and the target network node due to the first normalised SINR, regardless of whether the respective coverage areas are of different sizes, they are associated with different noise and/or interference levels, the wireless devices have different power class or the network nodes allow the wireless device to send more or less power in the respective coverage area of the source and target network nodes respectively.

Figure 2B:
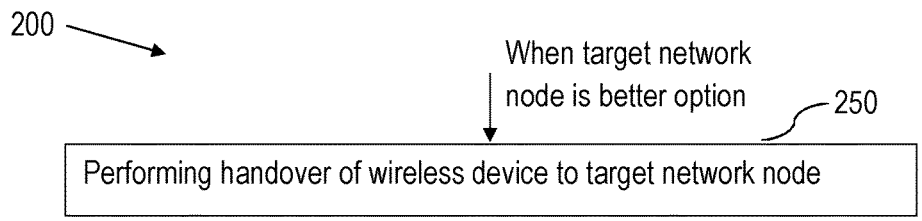
FIG. 2b is a flowchart of a method performed by a target network node according to another exemplifying embodiment.

The method may further comprise, as illustrated in FIG. 2b, when the target network node is a better option than the source network node for serving the wireless device, performing the handover of the wireless device to the target network node.

After the target network node has provided the source network node with the indication that the target network node indeed is the better option than the source network node for serving the wireless device, the source and the target network node engage in handing over the wireless device from the source network node to the target network node.

The target network node prepares for the incoming handover and the source network node performs signalling to the wireless device, the signalling comprising information about the target network node.

In an exemplifying embodiment, the source network node determines the quantity (second normalised SINR) SINRmaxDMRS "maximum expected uplink quality possible to achieve per PRB" for the wireless device in a cell of the source network node based on estimated uplink pathloss and average Noise+Interference in the cell of the source network node. The wireless device may frequently perform and report measurements on target frequency/frequencies or the wireless device may be ordered to do so if the second normalised SINR (e.g. SINRmaxDMRS) is below a threshold. Based on the measurement report from the wireless device a first normalised SINR (e.g. SINRmaxRSRP) is calculated for the source network node and the potential target network nodes (or for the cell of the source network node and for cells of potential target network nodes) but now based on DL pathloss. The SINRmaxRSRP(source) and the measured RSRP on best candidate target cell(s), i.e. target network nodes, is sent to target network node(s) e.g. in handover preparation. The target network node calculates SINRmaxRSRP(target) and make sure SINRmaxRSRP(target)>"good enough threshold" for target cell and optionally that SINRmaxRSRP(target)>SINRmaxRSRP(source). If one or both conditions are satisfied the target network node acknowledge the handover is ok from uplink perspective and send back handover request acknowledgement back to source network node otherwise target network node sends handover reject.

Figure 3:
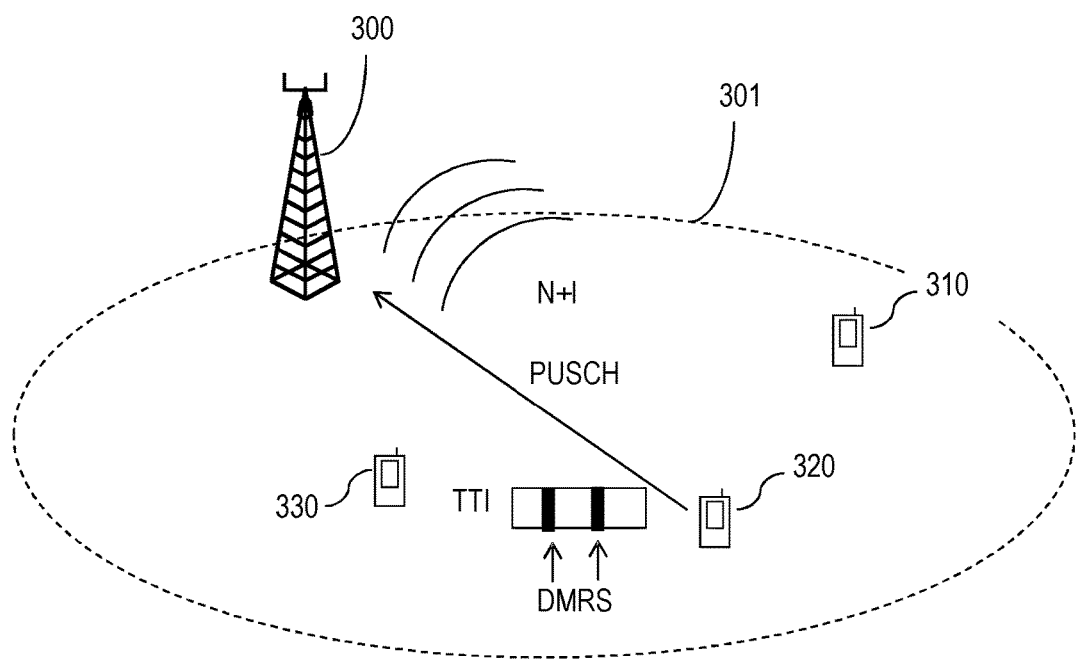
FIG. 3 is an illustration of SINR calculations for uplink supervision and uplink bad coverage events.

FIG. 3 is an illustration of SINR calculations for uplink supervision and uplink bad coverage events. When wireless device 320 is scheduled on PUSCH the network node 300 measures the Received Power Spectral Density from the wireless device as received by the network node [dBm/PRB], $PSD_{RX}$, the sum of the received power [dBm] over the PRB's scheduled for the scheduled wireless device during that Time Transmission Interval, TTI. An average over DMRSs and scheduled PRBs [dBm/PRB] for that TTI.

The $PSD_{TX}$ depends on Ppowerclass, $P_{EMAX}$, power control and $N_{PRB}$. $PSD_{TX}$=Pmax−$PH_{est}$−10 $\log_{10}$ ($N_{PRB}$) where Pmax=min(Ppowerclass,$P_{EMAX}$). Ppowerclass may be stored in a database or memory available to the network node. UEcontext. $P_{EMAX}$ may be broadcasted in the system information and is sent to target cell at handover EUtran-CellFDD/EUtranCellTDD.pMaxServingCell—optionally present. $PSD_{TX}$ stands for Actual UE transmitted power [dBm/PRB]. Ppowerclass represents Maximum RF output power of the UE according to UE power class as defined in TS 36.101. Measure [dBm]. This value may be stored in the UEcontext. $P_{EMAX}$ represents maximum transmission power level a wireless device may use when transmitting in the cell [dBm] defined in TS 36.101. $N_{PRB}$ represents number of PRB scheduled for the wireless device in a TTI. $PH_{est}$ represents Estimated power headroom. Estimated by e.g. USC, based on latest received PHR and the power control commands sent in UL grants on PDCCH since the last received PHR. PHR is the Power Headroom Report. Medium Access Control, MAC, control element sent on PUSCH each X ms (e.g. 200 ms) when the wireless device is scheduled. Pmax is the maximum power allowed for a UE to transmit in the cell (can be limited by UE power class or cell parameters).

The network nodes (source and target) constantly (also when no wireless device in the cell) measures N+I=(total received power over the whole bandwidth, BW, $-PSD_{RX}$). Measure: average [dBm/PRB] for that TTI.

SINR=$PSD_{RX}$−(N+I). This value does not consider the power class of the wireless device and actual transmitted power by the wireless device.

G=$PSD_{RX}$−$PSD_{TX}$, where G is Gain (path gain)=−Lp (path loss). Gain measures how much of the wireless device transmitted power that reaches the network node receiver. It is calculated at every scheduling of the wireless device.

$SINR_{maxDMRS}$=Pmax+G−(N+I)=Pmax+($PSD_{RX}$−$PSD_{TX}$)−(N+I)=Pmax+($PSD_{RX}$−(Pmax−$PH_{est}$−10 $\log_{10}(N_{PRB})$))−(N+I)=$PSD_{RX}$+$PH_{est}$+10 $\log_{10}(N_{PRB})$−(N+I).

Note: $PH_{est}$ should preferably be expressed relative to Pmax=min(Ppowerclass,$P_{EMAX}$)

Figure 4:
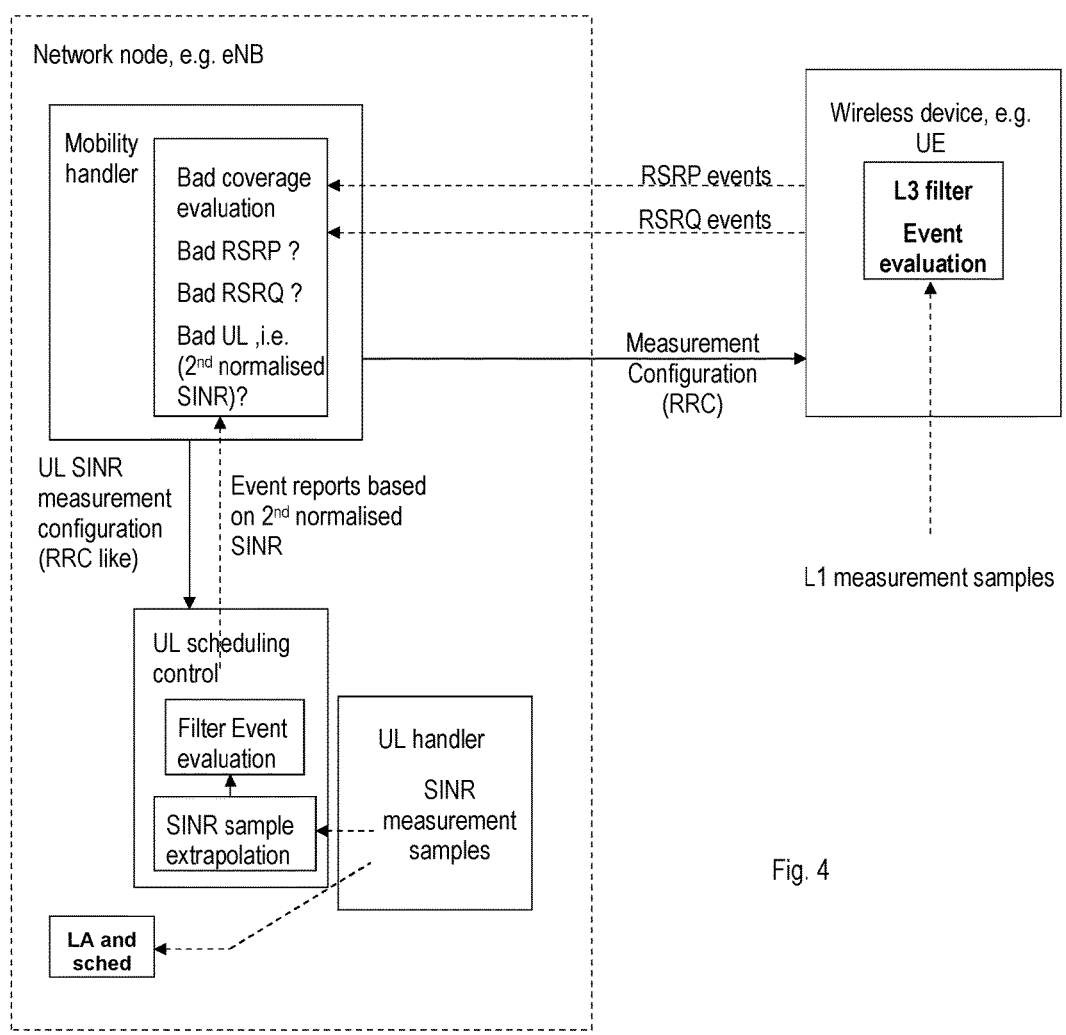
FIG. 4 is an illustration of the first normalised SINR, e.g. SINRmaxDMRS, from Uplink (UL) Scheduling Control, USC, to Mobility Handler, MH.

FIG. 4 is an illustration of the uplink SINRmaxDMRS from e.g. an Uplink (UL) Scheduling Control, USC, to a Mobility Handler, which may be used as a new mobility trigger. The SINRmaxDMRS represents the currently maximum achievable uplink SINT per PRB assuming the wireless device is using maximum (allowed in cell or wireless device power class limited) and one PRB only.

Figure 5:
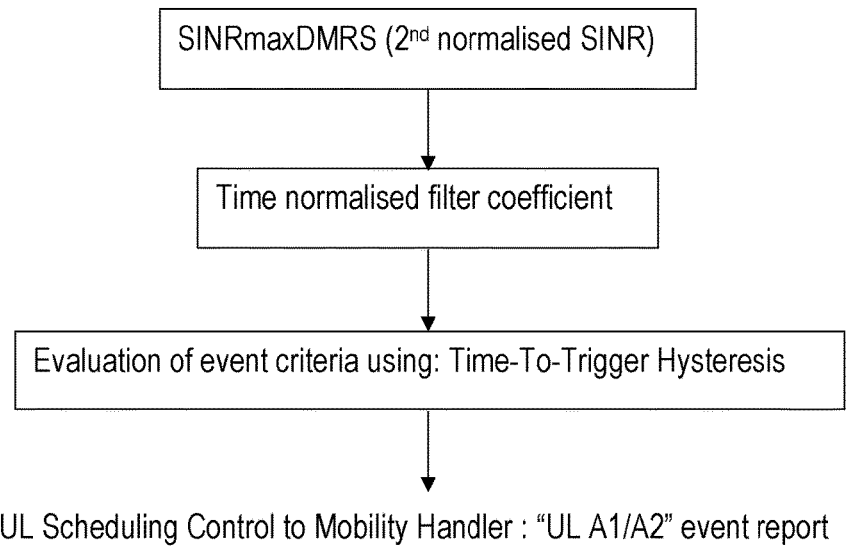
FIG. 5 is an illustration of a filter structure in a source network node base band, BB, for calculation of SINRmaxDMRS.

FIG. 5 illustrates a filter structure in a source network node base band, BB, for calculation of SINRmaxDMRS. FIG. 5 illustrates the second normalised SINR, e.g. the SINRmaxDMRS, being subjected to a time normalised filter coefficient. Using the result outputted from the time normalised filter coefficient, the source network node may determine whether the uplink is deemed poor using different evaluation criteria: e.g. time to trigger and hysteresis.

Figure 6:
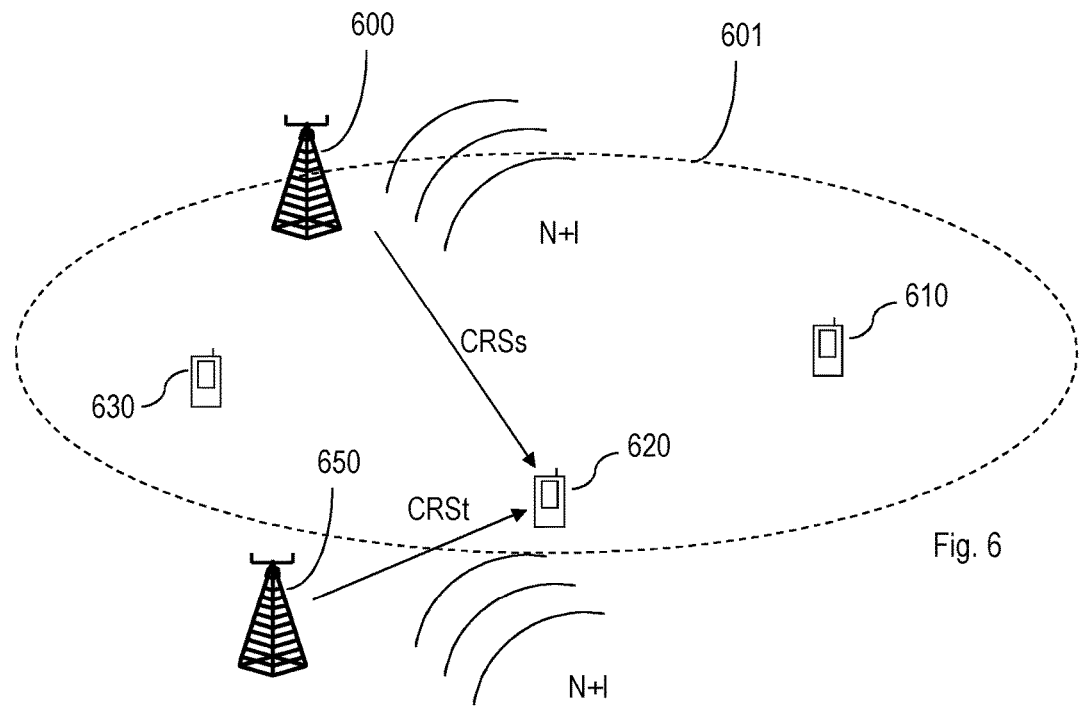
FIG. 6 is an illustration of calculation of the first normalised SINR, e.g. SINRmaxRSRP, using RSRP as reported by the wireless device, CRS power and downlink pathgain.

FIG. 6 is an illustration of calculation of the first normalised SINR, e.g. SINRmaxRSRP, using RSRP as reported by the wireless device, CRS power and downlink pathgain.

Pref=availableSectorPower/(#PRB*12), where 12 is number of Subcarriers in one PRB. Target cell Pref is known by target network node and source cell Pref is known by source network node. Pref is the power transmitted in the resource elements without boosting that carry the CRS (Cell-specific Reference Signal. availableSectorPower is a value that represents the sum of the power allocated for all the activated LTE cells in this sector. This value can be less than the sum of the configuredOutputPower*partOfSectorPower(start from L13B) for the following reasons: (a) Insufficient output power hardware activation codes, (b) Failed radio resources, (c) Radio hardware capability limitation. configuredOutputPower=20000 {0 . . . 250000} Unit: 1 mW, this value represents the sum of the power for all antenna connectors used by the sector. partOfSectorPower=100 {0 . . . 100} Unit: 1%, represents requested part of the total power in the SectorEquipment that must be allocated for the sectorCarrier. The output power is evenly distributed over antenna connectors used for TX transmission allocated for the SectorCarrier.

G=UErsrp−Pref−crsGain is a downlink estimated G (UL estimated G=$PSD_{RX}$−$PSD_{TX}$). SINR for the UL can be calculated using this downlink based G and can be used to compare source and target. This measure is called SINRmaxRSRP. $SINR_{max}RSRP$=Pmax+G−(N+I). crsGain=0 {−300, −200, −100, 0, 177, 300, 477, 600} Unit: 0.01 dB. The crsGain sets the DL power of the Cell specific Reference Signal (CRS) relatively a reference level defined by the power of the PDSCH type A resource elements. If crsGain is +3 dB, the CRS power is 3 dB higher than that of a PDSCH type A resource element. The settings crsGain=4.77 db and 6 dB are mapped to 3 dB. These settings are not supported. PDSCH type A resource elements are located in symbols that do not contain CRS. Dependencies: The crsGain only takes effect if the configured number of antenna ports used in a sector is 2, 4, or 8. In the one port case, crsGain is hardcoded to 0 dB. dlChannelBandwidth=10000 {1400, 3000, 5000, 10000, 15000, 20000} Unit: 1 kHz. dlChannelBandwidth represents the downlink channel bandwidth in the cell, and valid values are 1400=6 PRB's, 3000=15 PRB's, 5000=25 PRB's, 10000=50 PRB's, 15000=75 PRB's, 20000=100 PRB's. UErsrp is the RSRP as measured by the wireless device.

Consequently, uplink estimated $SINR_{max}DMRS$ is compared to configured UL "A1/A2"-like threshold. If "UL A2" is triggered Inter Frequency/Inter Radio Access Technologies, IEF/IRAT, measurements are started and event A5 (or A3) and/or B2 is configured in the wireless device. After receiving a Radio Resource Control, RRC, measurement report from the wireless device, the source network node may send the wireless device measured RSRP for source and target cell to the target network node. In addition, the source network node may also provide at least source cell RSRP based estimated $SINR_{max}RSRP$-source to the target network node in a private message. The target network node may calculate its own downlink estimated SINRmaxRSRP-target and compare it to the SINRmaxRSRP-source. If $SINR_{max}RSRP$-target is better than a minimum threshold and offset better than $SINR_{max}RSRP$-source, the target network node may accept the incoming handover request, else it may reject the incoming handover request. The target cell provides, to the source cell, the reason for reject (offset, minimum threshold, admission . . . ). The target cell also provides the target cell RSRP based estimated $SINR_{max}RSRP$(target) value in the X2 AP: HO preparation failure message back to source cell (useful for observability).

Figure 7:
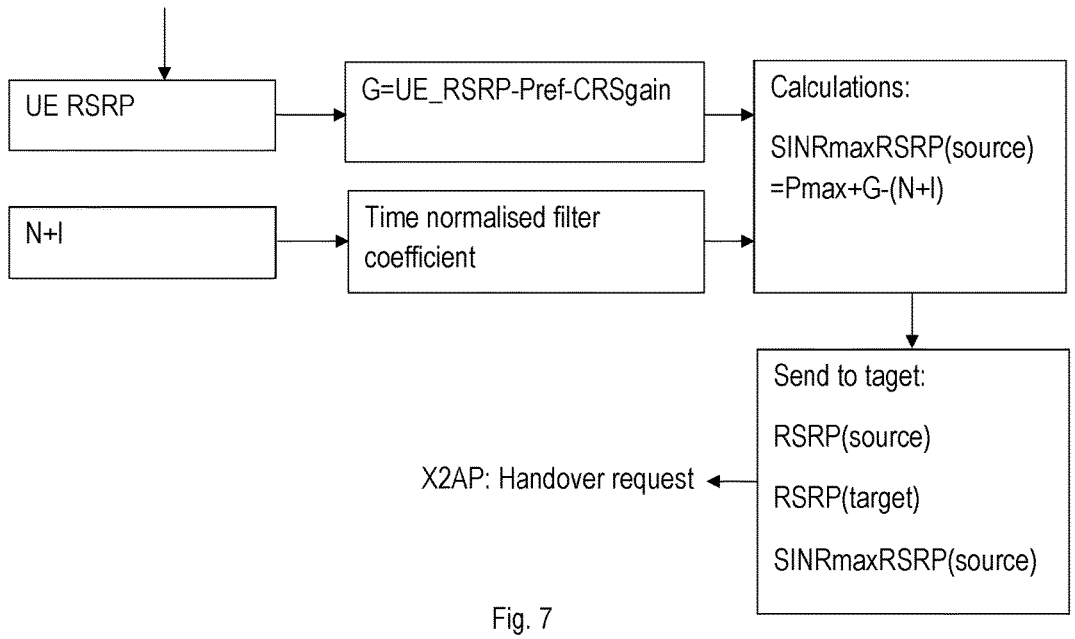
FIG. 7 is an illustration of handover preparation in the source network node based on downlink estimated SINRmaxRSRP.

FIG. 7 illustrates handover preparation in the source network node based on downlink estimated SINRmaxRSRP.

Figure 8:
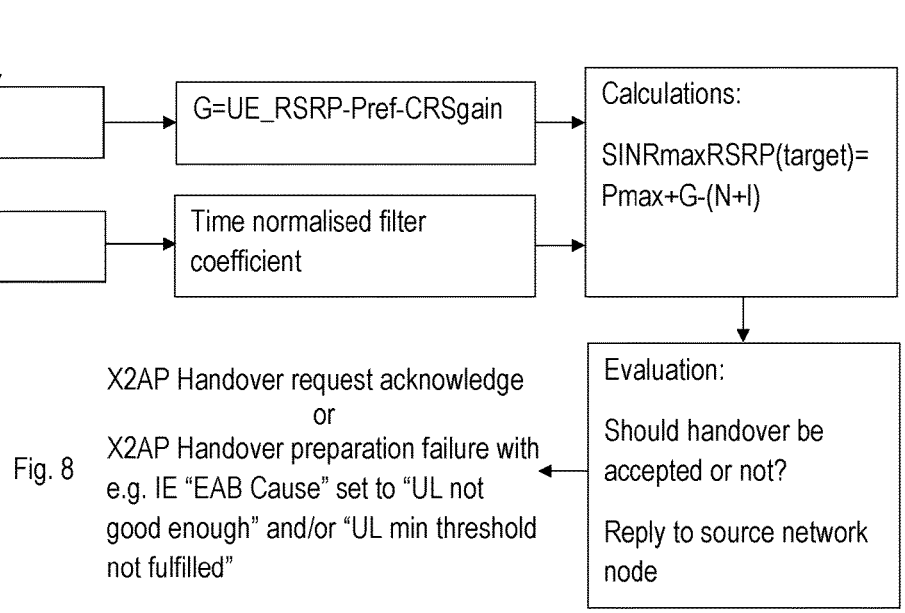
FIG. 8 is an illustration of a handover decision made by target network node based on downlink estimated SINRmaxRSRP.

FIG. 8 illustrates a handover decision made by target network node based on downlink estimated SINRmaxRSRP. The target network node may check whether $SINR_{max}RSRP$-target>$Thres_{min}SINR_{max}RSRP$, where $Thres_{min}SINR_{max}RSRP$ is a threshold indicating a minimum uplink quality that must be fulfilled in order for the target network node to accept any incoming handover request. It may be an operator parameter that the operator determines the value of. The target network node may also calculate a parameter, which may e.g. be denoted A3ULoffset", wherein A3ULoffset=SINRmaxRSRP-target-SINRmaxRSRP-source.

Figure 9A:
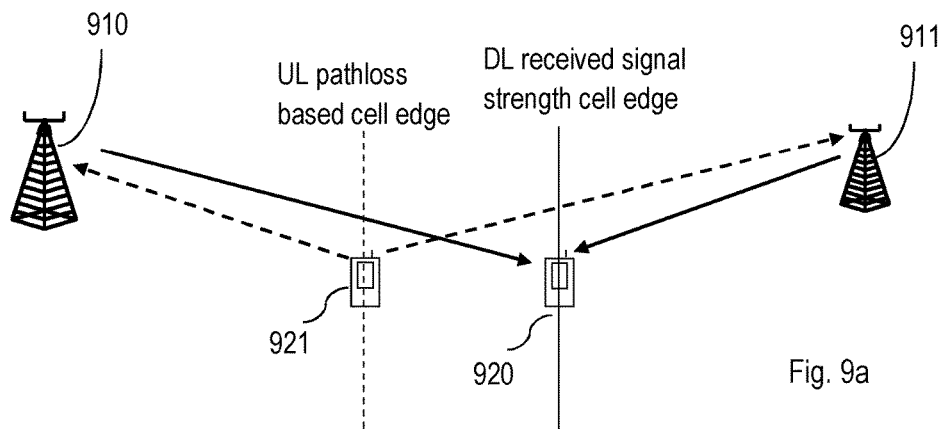
FIG. 9a is an illustration of an example of a macro network node 910 and a low power network node 911, wherein there are different cell edges in downlink and uplink.
Figure 9B:
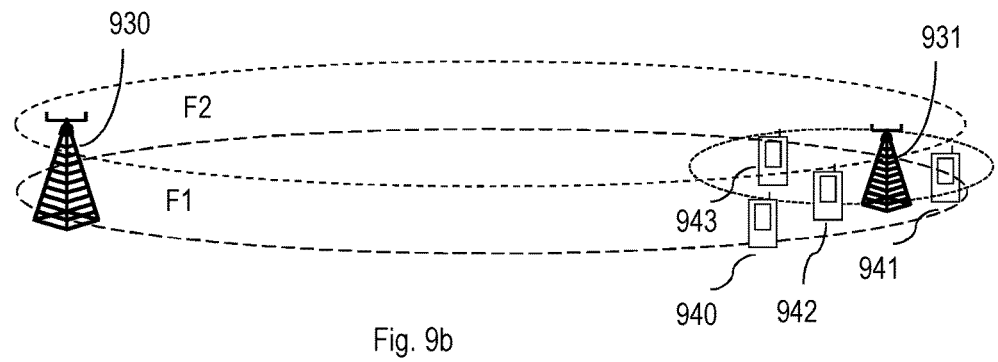
FIG. 9b is an illustration of an example of a macro network node 930 and a low power network node 931.

FIGS. 9a and 9b illustrate an example of a macro network node 910 and a low power network node 911, wherein there are different cell edges in downlink and uplink. In FIG. 9a, using uplink, UL, limit as cell edge: wireless devices connected to low power network node cell create UL interference in macro network node. Using downlink, DL, limit as cell edge: wireless devices connected to macro create UL interference in low power network node. DL cell edge is normally chosen in order to align idle and connected mode, therefore (i) cells of low power network node will have better UL relative to a macro network node, and (ii) cells of low power network node add UL interference in cell of macro network node.

In FIG. 9b, the uplink mobility trigger may, due to the solution and method described herein, handover wireless device 940 from F1 to F2 and save it from being dropped due to bad uplink SINR.

Figure 10:
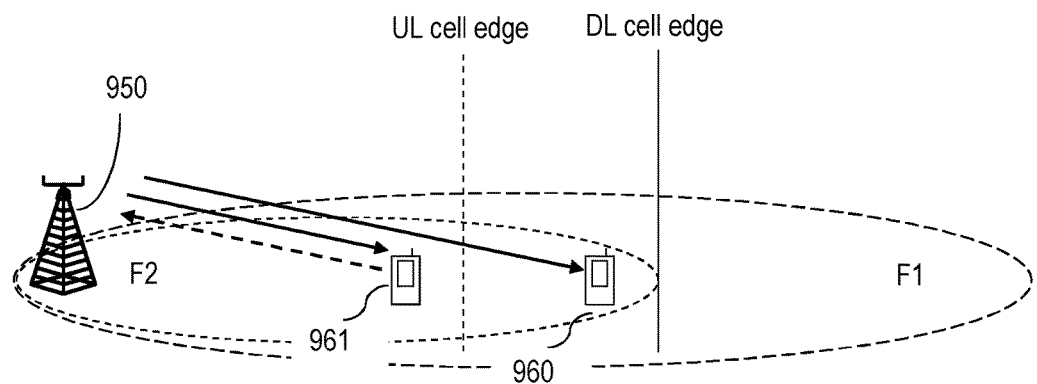
FIG. 10 is an illustration of an example of different macro layers with different path loss.

FIG. 10 is an illustration of an example of different macro layers with different path loss. FIG. 10 illustrates frequency layers with different path loss. F1: 700 MHz and F2: 2600 MHZ give scattered coverage in F2 and a problematic cell edge. UL/DL cell edges are not "in balance". The UL/DL cell edge depends on UL/DL link budgets—and is therefore service dependent. (In Time Division Duplex, TDD, there is a dependency on sub-frame allocation, etc.). Thus in the example of FIG. 10, the uplink mobility trigger may, due to the solution and method described herein, handover wireless device 960 to F1 and save it from drop due to bad uplink SINR.

RSRP is defined as the linear average over the power contributions (in [W]) of resource elements that carry cell-specific reference signals within the considered measurement frequency bandwidth. For RSRP determination, the cell-specific reference signals $R_0$ according to TS 36.211 shall be used. If the wireless device can reliably detect that $R_1$ is available, it may use $R_1$ in addition to $R_0$ to determine RSRP. The reference point for the RSRP shall be the antenna connector of the wireless device. If receiver diversity is in use by the wireless device, the reported value shall not be lower than the corresponding RSRP of any of the individual diversity branches.

The RSRP may be applicable for RRC_IDLE intra-frequency, RRC_IDLE inter-frequency, RRC_CONNECTED intra-frequency, and RRC_CONNECTED inter-frequency.

Embodiments herein also relate to a source network node serving a wireless device in a wireless communication network. The source network node has the same technical features, objects and advantages as the method performed by the source network node. The source network node will only be described in brief in order to avoid unnecessary repetition. The source network node will be described with reference to FIGS. 11 and 12.

Figure 11:
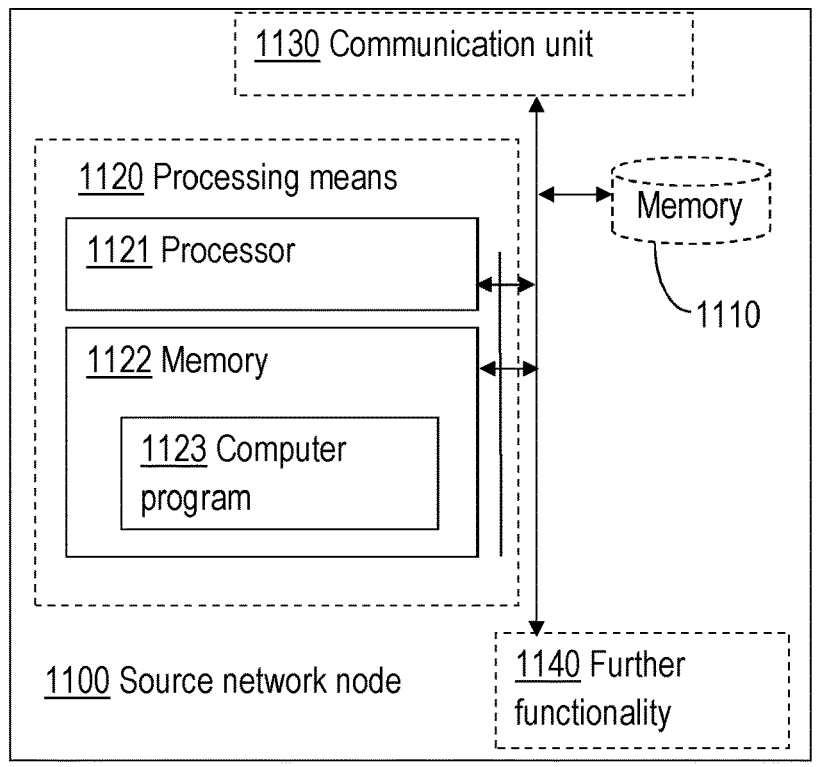
FIG. 11 is a block diagram of a source network node according to an exemplifying embodiment.
Figure 12:
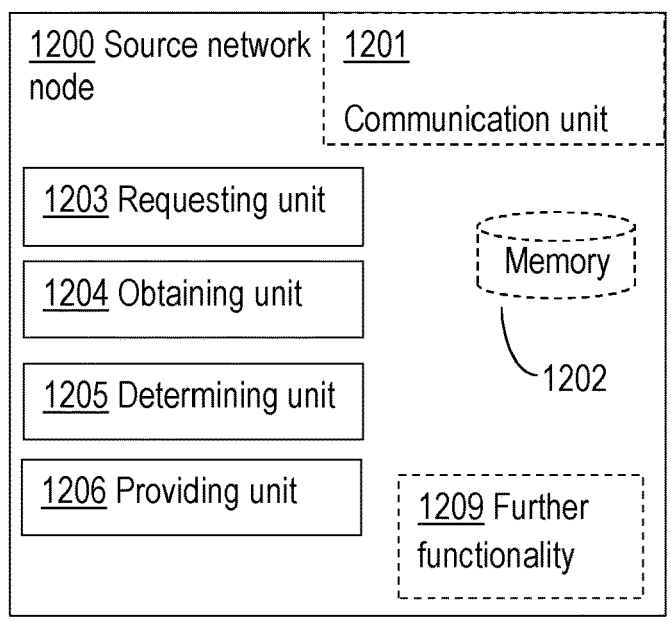
FIG. 12 is a block diagram of a source network node according to another exemplifying embodiment.

FIGS. 11 and 12 illustrate the source network node 1100, 1200 being configured for, when the uplink signal quality of a received uplink signal from the wireless device is deemed poor, requesting the wireless device to perform measurement(s) on possible target network node(s) and the source network node; and for obtaining a measurement report from the wireless device comprising performed measurement(s) on at least one possible target network node, the performed measurements indicating received signal strength for signal (s) received from the at least one possible target node. The source network node 1100, 1200 is further configured for determining a first normalised Signal to Interference and Noise Ratio, SINR, associated with the received signal strength as measured by the wireless device for signals received from the source network node; and for providing, to at least one of the at least one possible target network node, the determined first normalised SINR associated with the received signal strength for the source network node and the received signal strength of the at least one of the at least one possible target network node as received in the measurement report from the wireless device.

The source network node 1100, 1200 may be realised or implemented in various different ways. A first exemplifying implementation or realisation is illustrated in FIG. 11. FIG. 11 illustrates the source network node 1100, 1200 comprising a processor 1121 and memory 1122, the memory comprising instructions, e.g. by means of a computer program 1123, which when executed by the processor 1121 causes the source network node 1100, 1200 to request the wireless device to perform measurement(s) on possible target network node(s) and the source network node; and to obtain a measurement report from the wireless device comprising performed measurement(s) on at least one possible target network node, the performed measurements indicating received signal strength for signal(s) received from the at least one possible target node. The memory further comprises instructions, which when executed by the processor 1121 causes the source network node 1100, 1200 to determine a first normalised Signal to Interference and Noise Ratio, SINR, associated with the received signal strength as measured by the wireless device for signals received from the source network node; and to provide, to at least one of the at least one possible target network node, the determined first normalised SINR associated with the received signal strength for the source network node and the received signal strength of the at least one of the at least one possible target network node as received in the measurement report from the wireless device.

FIG. 11 further illustrates the source network node 1100 comprising a memory 1110. It is pointed out that FIG. 11 is merely an exemplifying illustration and memory 1110 may be optional, be a part of the memory 1122 or be a further memory of the source network node 1100. The memory may for example comprise information relating to the source network node 1100, to statistics of operation of the source network node 1100. FIG. 11 further illustrates the source network node 1100 comprising processing means 1120, which comprises the memory 1122 and the processor 1121. Still further, FIG. 11 illustrates the source network node 1100 comprising a communication unit 1130. The communication unit 1130 may comprise an interface through which the source network node 1100 communicates with other nodes or entities of the communication network as well as other communication units. FIG. 11 also illustrates the source network node 1100 comprising further functionality 1140. The further functionality 1140 may comprise hardware of software necessary for the source network node 1100 to perform different tasks that are not disclosed herein.

An alternative exemplifying implementation of the source network node 1100, 1200 is illustrated in FIG. 12. FIG. 12 illustrates source network node 1200 comprising a requesting unit 1203 for requesting the wireless device to perform measurement(s) on possible target network node(s) and the source network node; and an obtaining unit 1204 for obtaining a measurement report from the wireless device comprising performed measurement(s) on at least one possible target network node, the performed measurements indicating received signal strength for signal(s) received from the at least one possible target node. The source network node 1100, 1200 further comprises a determining unit 1205 for determining a first normalised SINR associated with the received signal strength as measured by the wireless device for signals received from the source network node; and a providing unit 1206 for providing, to at least one of the at least one possible target network node, the determined first normalised SINR associated with the received signal strength for the source network node and the received signal strength of the at least one of the at least one possible target network node as received in the measurement report from the wireless device.

FIG. 12 illustrates the source network node 1200 further comprising a communication unit 1201. Through this unit, the source network node 1200 is adapted to communicate with other nodes and/or entities in the wireless communication network. The communication unit 1201 may comprise more than one receiving arrangement. For example, the communication unit 1201 may be connected to an antenna, by means of which the source network node 1200 is enabled to communicate with other nodes and/or entities in the wireless communication network. Similarly, the communication unit 1201 may comprise more than one transmitting arrangement, which in turn is connected to both a wire and an antenna, by means of which the source network node 1200 is enabled to communicate with other nodes and/or entities in the wireless communication network. The source network node 1200 is further illustrated comprising a memory 1202 for storing data. Further, the source network node 1200 may comprise a control or processing unit (not shown) which in turn is connected to the different units 1203-1206. It shall be pointed out that this is merely an illustrative example and the source network node 1200 may comprise more, less or other units or modules which execute the functions of the source network node 1200 in the same manner as the units illustrated in FIG. 12.

It should be noted that FIG. 12 merely illustrates various functional units in the source network node 1200 in a logical sense. The functions in practice may be implemented using any suitable software and hardware means/circuits etc. Thus, the embodiments are generally not limited to the shown structures of the source network node 1200 and the functional units. Hence, the previously described exemplary embodiments may be realised in many ways. For example, one embodiment includes a computer-readable medium having instructions stored thereon that are executable by the control or processing unit for executing the method steps in the source network node 1200. The instructions executable by the computing system and stored on the computer-readable medium perform the method steps of the source network node 1200 as set forth in the claims.

The source network node has the same possible advantages as the method performed by the source network node. One possible advantage is that it is possible to trigger a measurement by the wireless device only if the received uplink signal quality is bad. Another possible solution is that it is possible to compare source and target uplink signal quality using a quantity that has the same definition, the first normalised SINR, and which is based on one measurement device, i.e. the wireless device. Another possible advantage is that it is possible to estimate uplink signal quality for a target network node without being forced to measure on a uplink transmission from the wireless device for the target network node. Still a possible advantage is that the same threshold values may be used in the source and the target network node due to the first normalised SINR, regardless of whether the respective coverage areas are of different sizes, they are associated with different noise and/or interference levels, the wireless devices have different power class or the network nodes allow the wireless device to send more or less power in the respective coverage area of the source and target network nodes respectively.

The received signal strength may be represented by RSRP, and wherein the first normalised SINR associated with the received signal strength is determined at least partly based on the RSRP associated with the source network node.

According to an embodiment, the source network node 1100, 1200 is configured for determining a second normalised SINR associated with received signal power as measured by the source network node based on the received uplink signal from the wireless device, wherein the uplink signal quality of the received signal is deemed poor when the received signal strength is below a predefined threshold, e.g. the second normalised SINR for the source network node is below a predefined threshold.

The second normalised SINR for the source network node may be determined based on a reference signal or symbol(s) transmitted by the wireless device, e.g. DMRS of the received signal and indicates a maximum expected uplink quality possible to achieve per PRB.

The second normalised SINR for the source network node may further be based on an estimated pathloss, which is estimated based on received power in uplink knowing the transmission power used by the wireless device to transmit the signal, and also based on (i) power headroom reports from the wireless device, on (ii) maximum transmission power of the wireless device, on (iii) allowed transmission power for the wireless device and based on (iv) an average noise and interference in a cell of the source network node by means of which the source network node is servicing the wireless device.

The first normalised SINR for the source network node is determined based on an RSRP for a downlink Cell-specific Reference Signal, CRS, transmitted from the source network node as reported by the wireless device, and pathloss between the source network node and the wireless device, wherein the first normalised SINR for the source network node indicates a maximum expected uplink quality possible to achieve per PRB.

According to an embodiment, the source network node 1100, 1200 is configured for obtaining an indication from the at least one of the at least one target network node indicating whether the respective target network node is a better option than the source network node for serving the wireless device.

According to yet an embodiment, the providing of the determined first normalised SINR for the source network node and the received signal strength of the at least one possible target network node; and/or the obtaining of the indication from the at least one of the at least one target network node comprises communication between the source network node and the target network node(s) by means of the X2 or S1 protocol.

According to yet an embodiment, communication by means of the X2 protocol comprises X2 private messages.

According to a further embodiment, the providing of the determined first normalised SINR for the source network node and the received signal strength of the at least one possible target network node is performed by transmitting a handover request to the at least one possible target network node comprising the determined normalised SINR and the RSRP.

According to another embodiment, the obtaining of the indication from the at least one of the at least one target network node comprises receiving a handover request acknowledge message indicating an acknowledgement or a refusal for a handover of the wireless device.

According to yet an embodiment, the received handover request acknowledge message comprises an indication of a reason for the refusal if the handover request acknowledge message comprises a refusal, e.g. an estimated first normalised SINR for the target network node.

Embodiments herein also relate to a target network node for handing over a wireless device to the target network node from a source network node serving the wireless device in a wireless communication network. The target network node has the same technical features, objects and advantages as the method performed by the target network node. The target network node will only be described in brief in order to avoid unnecessary repetition. The target network node will be described with reference to FIGS. 13 and 14.

Figure 13:
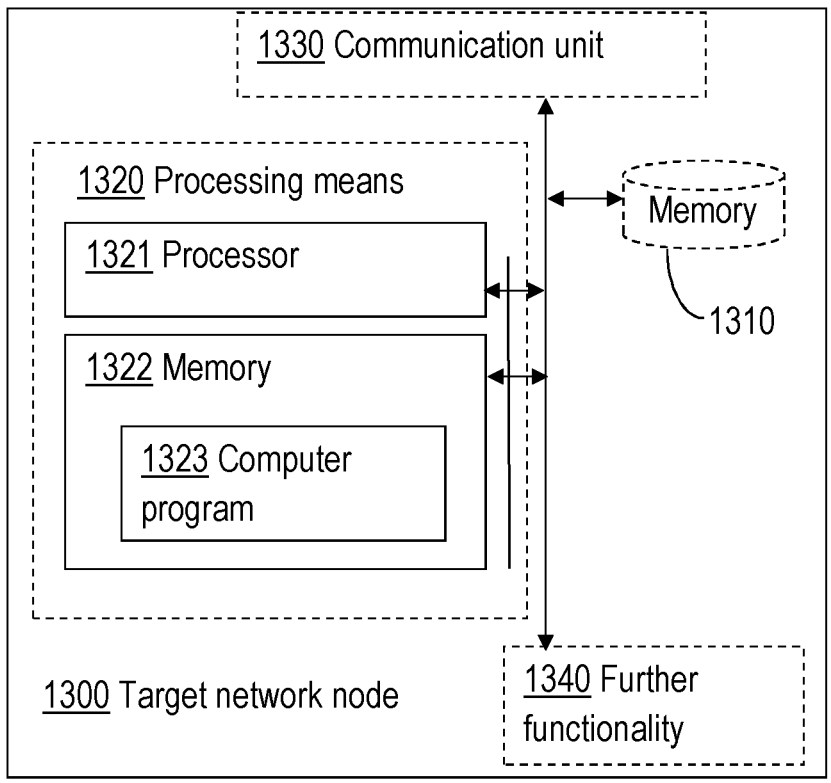
FIG. 13 is a block diagram of a target network node according to an exemplifying embodiment.
Figure 14:
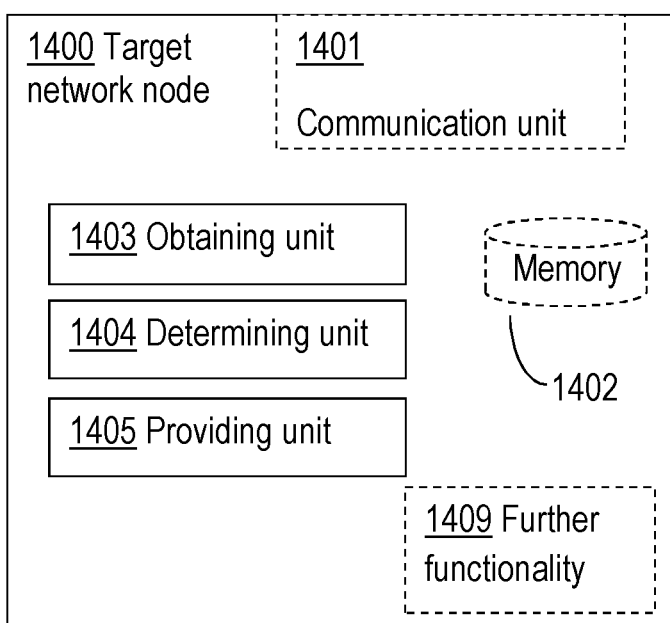
FIG. 14 is a block diagram of a target network node according to another exemplifying embodiment.

FIGS. 13 and 14 illustrate the target network node 1300, 1400 being configured for obtaining, from the source network node, a determined first normalised SINR for the source network node in relation to the wireless device and a received signal strength for signal(s) transmitted from the target network node as received by the wireless device; and for determining a second normalised SINR for the target network node based at least partly on the received signal strength as obtained from the source network node. The target network node 1300, 1400 is further configured for determining whether the target network node is a better option than the source network node for serving the wireless device based on the second determined SINR for the target network node and based on the received first normalised SINR for the source network node; and for providing, to the source network node, an indication indicating whether the target network node is a better option than the source network node for serving the wireless device.

The target network node 1300, 1400 may be realised or implemented in various different ways. A first exemplifying implementation or realisation is illustrated in FIG. 13. FIG. 13 illustrates the target network node 1300 comprising a processor 1321 and memory 1322, the memory comprising instructions, e.g. by means of a computer program 1323, which when executed by the processor 1321 causes the target network node 1300 to obtain, from the source network node, a determined first normalised SINR for the source network node in relation to the wireless device and a received signal strength for signal(s) transmitted from the target network node as received by the wireless device; and to determine a first normalised SINR for the target network node based at least partly on the received signal strength as obtained from the source network node. The memory further comprises instructions, which when executed by the processor 1321 causes the target network node 1300 to determine whether the target network node is a better option than the source network node for serving the wireless device based on the first determined SINR for the target network node and based on the received first normalised SINR for the source network node; and to provide, to the source network node, an indication indicating whether the target network node is a better option than the source network node for serving the wireless device.

FIG. 13 also illustrates the target network node 1300 comprising a memory 1310. It shall be pointed out that FIG. 13 is merely an exemplifying illustration and memory 1310 may be optional, be a part of the memory 1322 or be a further memory of the target network node 1300. The memory may for example comprise information relating to the target network node 1300, to statistics of operation of the target network node 1300, just to give a couple of illustrating examples. FIG. 13 further illustrates the target network node 1300 comprising processing means 1320, which comprises the memory 1322 and the processor 1321. Still further, FIG. 13 illustrates the target network node 1300 comprising a communication unit 1330. The communication unit 1330 may comprise an interface through which the target network node 1300 communicates with other nodes or entities of the communication network as well as other communication units. FIG. 13 also illustrates the target network node 1300 comprising further functionality 1340. The further functionality 1340 may comprise hardware of software necessary for the target network node 1300 to perform different tasks that are not disclosed herein.

An alternative exemplifying implementation of the target network node 1300, 1400 is illustrated in FIG. 14. FIG. 14 illustrates the target network node 1400 comprising a obtaining unit 1403 for obtaining, from the source network node, a determined first normalised SINR for the source network node in relation to the wireless device and a received signal strength for signal(s) transmitted from the target network node as received by the wireless device. The target network node 1400 further comprises a determining unit 1404 for determining a first normalised SINR for the target network node based at least partly on the received signal strength as obtained from the source network node; and for determining whether the target network node is a better option than the source network node for serving the wireless device based on the first determined SINR for the target network node and based on the received first normalised SINR for the source network node. Still further, the target network node 1400 comprises a providing unit 1405 for providing, to the source network node, an indication indicating whether the target network node is a better option than the source network node for serving the wireless device.

In FIG. 14, the target network node 1400 is also illustrated comprising a communication unit 1401. Through this unit, the target network node 1400 is adapted to communicate with other nodes and/or entities in the wireless communication network. The communication unit 1401 may comprise more than one receiving arrangement. For example, the communication unit 1401 may be connected to both a wire and an antenna, by means of which the target network node 1400 is enabled to communicate with other nodes and/or entities in the wireless communication network. Similarly, the communication unit 1401 may comprise more than one transmitting arrangement, which in turn is connected to both a wire and an antenna, by means of which the target network node 1400 is enabled to communicate with other nodes and/or entities in the wireless communication network. The target network node 1400 further comprises a memory 1402 for storing data. Further, the target network node 1400 may comprise a control or processing unit (not shown) which in turn is connected to the different units 1403-1405. It shall be pointed out that this is merely an illustrative example and the target network node 1400 may comprise more, less or other units or modules which execute the functions of the target network node 1400 in the same manner as the units illustrated in FIG. 14.

It should be noted that FIG. 14 merely illustrates various functional units in the target network node 1400 in a logical sense. The functions in practice may be implemented using any suitable software and hardware means/circuits etc. Thus, the embodiments are generally not limited to the shown structures of the target network node 1400 and the functional units. Hence, the previously described exemplary embodiments may be realised in many ways. For example, one embodiment includes a computer-readable medium having instructions stored thereon that are executable by the control or processing unit for executing the method steps in the target network node 1400. The instructions executable by the computing system and stored on the computer-readable medium perform the method steps of the target network node 1400 as set forth in the claims.

The target network node has the same possible advantages as the method performed by the target network node. One possible advantage is that it is possible to trigger a measurement by the wireless device only if the received uplink signal quality is bad. Another possible solution is that it is possible to compare source and target uplink signal quality using a quantity that has the same definition, the first normalised SINR, and which is based on one measurement device, i.e. the wireless device. Another possible advantage is that it is possible to estimate uplink signal quality for a target network node without being forced to measure on a uplink transmission from the wireless device for the target network node. Still a possible advantage is that the same threshold values may be used in the source and the target network node due to the first normalised SINR, regardless of whether the respective coverage areas are of different sizes, they are associated with different noise and/or interference levels, the wireless devices have different power class or the network nodes allow the wireless device to send more or less power in the respective coverage area of the source and target network nodes respectively.

According to an embodiment, the target network node 1300, 1400 further is configured for, when the target network node is a better option than the source network node for serving the wireless device, performing the handover of the wireless device to the target network node.

Figure 15:
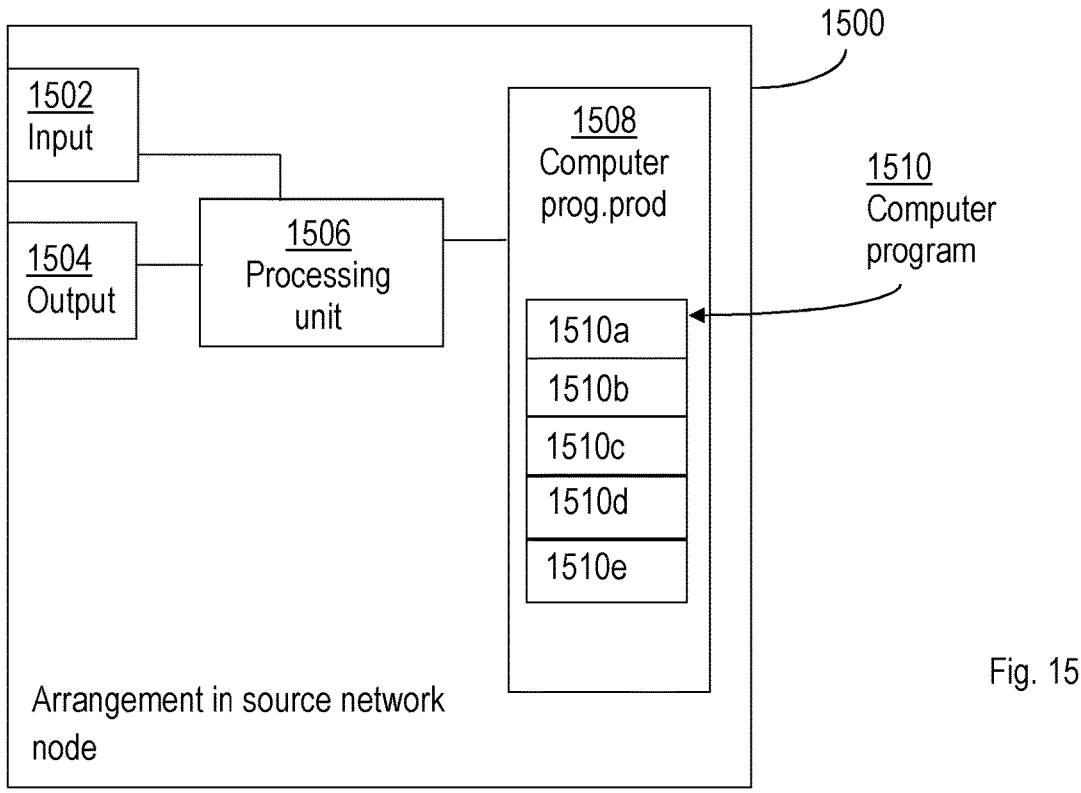
FIG. 15 is a block diagram of an arrangement in a source network node according to an exemplifying embodiment.

FIG. 15 schematically shows an embodiment of an arrangement 1500 in a source network node 1200. Comprised in the arrangement in the network node are here a processing unit 1506, e.g. with a Digital Signal Processor, DSP. The processing unit 1506 may be a single unit or a plurality of units to perform different actions of procedures described herein. The arrangement 1500 in the source network node 1200 may also comprise an input unit 1502 for receiving signals from other entities, and an output unit 1504 for providing signal(s) to other entities. The input unit and the output unit may be arranged as an integrated entity or as illustrated in the example of FIG. 12, as one or more interfaces 1201.

Furthermore, the arrangement 1500 in the source network node 1200 comprises at least one computer program product 1508 in the form of a non-volatile memory, e.g. an Electrically Erasable Programmable Read-Only Memory, EEPROM, a flash memory and a hard drive. The computer program product 1508 comprises a computer program 1510, which comprises code means, which when executed in the processing unit 1506 in the arrangement in the source network node causes the source network node to perform the actions e.g. of the procedure described earlier in conjunction with FIGS. 1*a*-1*c*.

The computer program modules could essentially perform the actions of the flow illustrated in FIGS. 1*a*-1*c*, to emulate the source network node 1200. In other words, when the different computer program modules are executed in the processing unit 1506, they may correspond to the units 1203-1206 of FIG. 12.

Figure 16:
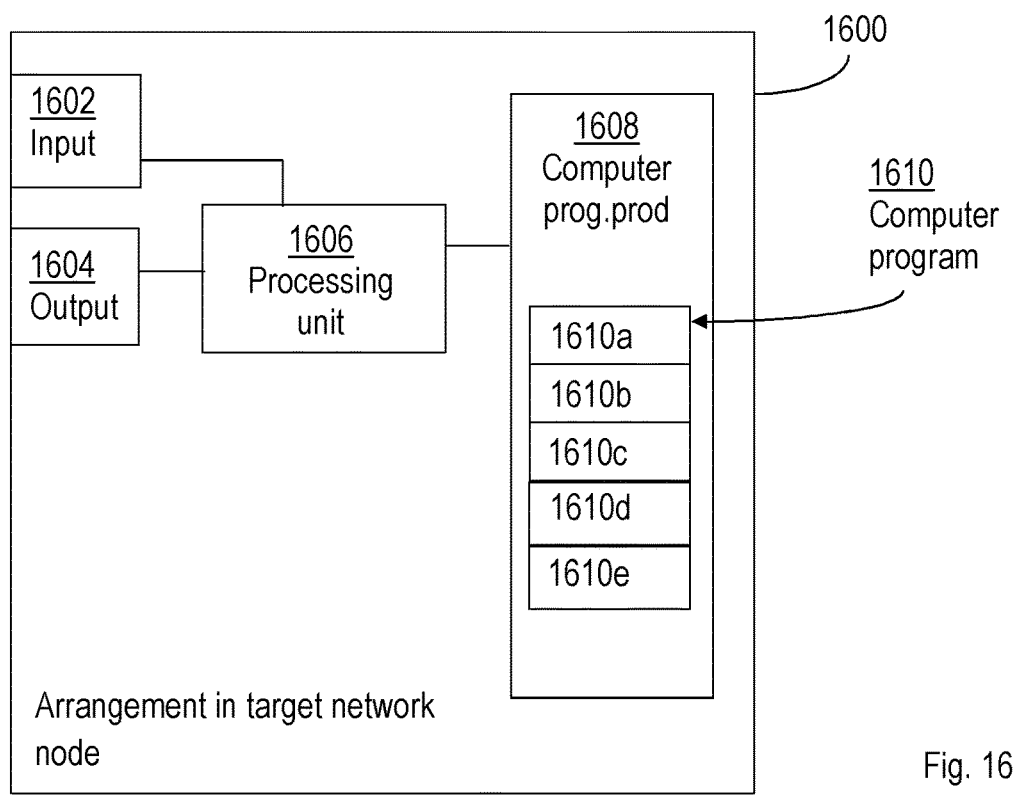
FIG. 16 is a block diagram of an arrangement in a target network node according to an exemplifying embodiment.

FIG. 16 schematically shows an embodiment of an arrangement 1600 a target network nod 1400. Comprised in the arrangement 1600 in the target network node 1400 are here a processing unit 1606, e.g. with a Digital Signal Processor. The processing unit 1606 may be a single unit or a plurality of units to perform different actions of procedures described herein. The arrangement 1600 in the target network node 1200 may also comprise an input unit 1602 for receiving signals from other entities, and an output unit 1604 for providing signal(s) to other entities. The input unit and the output unit may be arranged as an integrated entity or as illustrated in the example of FIG. 14, as one or more interfaces 1401.

Furthermore, the arrangement 1600 in the target network node 1400 comprises at least one computer program product 1608 in the form of a non-volatile memory, e.g. an Electrically Erasable Programmable Read-Only Memory, EEPROM, a flash memory and a hard drive. The computer program product 1608 comprises a computer program 1610, which comprises code means, which when executed in the processing unit 1606 in the arrangement 1600 in the target network node causes the target network node 1400 to perform the actions e.g. of the procedure described earlier in conjunction with FIGS. 2*a*-2*b*.

The computer program modules could essentially perform the actions of the flow illustrated in FIGS. 2*a*-2*b*, to emulate the target network node 1400. In other words, when the different computer program modules are executed in the processing unit 1606, they may correspond to the units 1403-1405 of FIG. 14.

Although the code means in the respective embodiments disclosed above in conjunction with FIGS. 12 and 14 are implemented as computer program modules which when executed in the respective processing unit causes the source network node and the target network node respectively to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the source network node and the target network node respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a source network node serving a wireless device in a wireless communication network, the method comprising, when the uplink signal quality of a received uplink signal from the wireless device is deemed poor:
   requesting the wireless device to perform measurement(s) on possible target network node(s) and the source network node,
   obtaining a measurement report from the wireless device comprising performed measurement(s) on at least one possible target network node, the performed measurements indicating received signal strength for signal(s) received from the at least one possible target node,
   determining a first normalised Signal to Interference and Noise Ratio, SINR, associated with the received signal strength as measured by the wireless device for signals received from the source network node, and
   providing, to at least one of the at least one possible target network node, the determined first normalised SINR associated with the received signal strength for the source network node and the received signal strength of the at least one of the at least one possible target network node as received in the measurement report from the wireless device.

2. A method according to claim 1, wherein the received signal strength is represented by Reference Signal Received Power, RSRP, and wherein the first normalised SINR associated with the received signal strength is determined at least partly based on the RSRP associated with the source network node.

3. A method according to claim 2, further comprising determining a second normalised SINR associated with received signal power as measured by the source network node based on the received uplink signal from the wireless device, wherein the uplink signal quality of the received signal is deemed poor when the received signal strength is below a predefined threshold.

4. A method according to claim 3, wherein the second normalised SINR for the source network node is determined based on a reference signal or symbol(s) transmitted by the wireless device.

5. A method according to claim 4, wherein the second normalised SINR for the source network node is further based on an estimated pathloss, which is estimated based on received power in uplink knowing the transmission power used by the wireless device to transmit the signal, and also based on (i) power headroom reports from the wireless device, on (ii) maximum transmission power of the wireless device, on (iii) allowed transmission power for the wireless device and based on (iv) an average noise and interference in a cell of the source network node by means of which the source network node is servicing the wireless device.

6. A method according to claim 1, wherein the first normalised SINR for the source network node is determined based on an RSRP for a downlink Cell-specific Reference Signal, CRS, transmitted from the source network node as reported by the wireless device, and pathloss between the source network node and the wireless device, wherein the first normalised SINR for the source network node indicates a maximum expected uplink quality possible to achieve per Physical Resource Block, PRB.

7. A method according to claim 1, further comprising obtaining an indication from the at least one of the at least one target network node indicating whether the respective target network node is a better option than the source network node for serving the wireless device.

8. A method according to claim 7, wherein the obtaining of the indication from the at least one of the at least one target network node comprises receiving a handover request acknowledge message indicating an acknowledgement or a refusal for a handover of the wireless device.

9. A method according to claim 8, wherein the received handover request acknowledge message comprises an indication of a reason for the refusal if the handover request acknowledge message comprises a refusal.

10. A method according to claim 1, wherein the providing of the determined first normalised SINR for the source network node and the received signal strength of the at least one possible target network node; and/or the obtaining of the indication from the at least one of the at least one target network node comprises communication between the source network node and the target network node(s) by means of the X2 or S1 protocol.

11. A method according to claim 10, wherein communication by means of the X2 protocol comprises X2 private messages.

12. A method according to claim 1, wherein the providing of the determined first normalised SINR for the source network node and the received signal strength of the at least one possible target network node is performed by transmitting a handover request to the at least one possible target network node comprising the determined normalised SINR and the RSRP.

13. A method performed by a target network node for handing over a wireless device to the target network node from a source network node serving the wireless device in a wireless communication network, the method comprising:
   obtaining, from the source network node, a determined first normalised Signal to Interference and Noise Ratio, SINR for the source network node in relation to the wireless device and a received signal strength for signal(s) transmitted from the target network node as received by the wireless device,
   determining a first normalised SINR for the target network node based at least partly on the received signal strength as obtained from the source network node,
   determining whether the target network node is a better option than the source network node for serving the wireless device based on the first determined SINR for the target network node and based on the received first normalised SINR for the source network node, and
   providing, to the source network node, an indication indicating whether the target network node is a better option than the source network node for serving the wireless device.

14. A method according to claim 13, further comprising, when the target network node is a better option than the source network node for serving the wireless device, performing the handover of the wireless device to the target network node.

15. A source network node serving a wireless device in a wireless communication network, the source network node comprising:
   a processor; and
   memory comprising executable instructions that when executed by the processor causes the processor, when the uplink signal quality of a received uplink signal from the wireless device is deemed poor, to perform operations comprising, requesting the wireless device to perform measurement(s) on possible target network node(s) and the source network node, obtaining a measurement report from the wireless device comprising performed measurement(s) on at least one possible target network node, the performed measurements indicating received signal strength for signal(s) received from the at least one possible target node, determining a first normalised Signal to Interference and Noise Ratio, SINR, associated with the received signal strength as measured by the wireless device for signals received from the source network node, and providing, to at least one of the at least one possible target network node, the determined first normalised SINR associated with the received signal strength for the source network node and the received signal strength of the at least one of the at least one possible target network node as received in the measurement report from the wireless device.

16. A source network node according to claim 15, wherein the received signal strength is represented by Reference Signal Received Power, RSRP, and wherein the first normalised SINR associated with the received signal strength is determined at least partly based on the RSRP associated with the source network node.

17. A source network node according to claim 15, wherein the memory further comprises executable instructions that when executed by the processor causes the processor to further perform operations comprising, determining a second normalised SINR associated with received signal power as measured by the source network node based on the received uplink signal from the wireless device, wherein the uplink signal quality of the received signal is deemed poor when the received signal strength is below a predefined threshold.

18. A source network node according to claim 17, wherein the second normalised SINR for the source network node is determined based on a reference signal or symbol(s) transmitted by the wireless device.

19. A source network node according to claim 18, wherein the second normalised SINR for the source network node is further based on an estimated pathloss, which is estimated based on received power in uplink knowing the transmission power used by the wireless device to transmit the signal, and also based on (i) power headroom reports from the wireless device, on (ii) maximum transmission power of the wireless device, on (iii) allowed transmission power for the wireless device and based on (iv) an average noise and interference in a cell of the source network node by means of which the source network node is servicing the wireless device.

20. A source network node according to claim 15, wherein the first normalised SINR for the source network node is determined based on an RSRP for a downlink Cell-specific Reference Signal, CRS, transmitted from the source network node as reported by the wireless device, and pathloss between the source network node and the wireless device, wherein the first normalised SINR for the source network node indicates a maximum expected uplink quality possible to achieve per PRB.

21. A source network node according to claim 15, wherein the memory further comprises executable instructions that when executed by the processor causes the processor to further perform operations comprising, obtaining an indication from the at least one of the at least one target network node indicating whether the respective target network node is a better option than the source network node for serving the wireless device.

22. A source network node according to claim 15, wherein the providing of the determined first normalised SINR for the source network node and the received signal strength of the at least one possible target network node; and/or the obtaining of the indication from the at least one of the at least one target network node comprises communication between the source network node and the target network node(s) by means of the X2 or S1 protocol.

23. A source network node according to claim 22, wherein communication by means of the X2 protocol comprises X2 private messages.

24. A target network node for handing over a wireless device to the target network node from a source network node serving the wireless device in a wireless communication network, the target network node comprising:

a processor; and memory comprising executable instructions that when executed by the processor causes the processor to perform operations comprising, obtaining, from the source network node, a determined first normalised Signal to Interference and Noise Ratio, SINR for the source network node in relation to the wireless device and a received signal strength for signal(s) transmitted from the target network node as received by the wireless device, determining a first normalised SINR for the target network node based at least partly on the received signal strength as obtained from the source network node, determining whether the target network node is a better option than the source network node for serving the wireless device based on the first determined SINR for the target network node and based on the received first normalised SINR for the source network node, and providing, to the source network node, an indication indicating whether the target network node is a better option than the source network node for serving the wireless device.

25. A target network node according to claim 24, wherein the memory further comprises executable instructions that when executed by the processor causes the processor to further perform operations comprising, when the target network node is a better option than the source network node for serving the wireless device, performing the handover of the wireless device to the target network node.

* * * * *